United States Patent
Serra et al.

(10) Patent No.: US 7,477,232 B2
(45) Date of Patent: Jan. 13, 2009

(54) METHODS AND SYSTEMS FOR INTERACTION WITH THREE-DIMENSIONAL COMPUTER MODELS

(75) Inventors: Luis Serra, Singapore (SG); Chee Keong Eugene Lee, Singapore (SG); Hern Ng, Singapore (SG)

(73) Assignee: Volume Interactions Pte., Ltd., Singapore (SG)

( * ) Notice: Subject to any disclaimer, the term of this patent is extended or adjusted under 35 U.S.C. 154(b) by 0 days.

(21) Appl. No.: 10/488,331

(22) PCT Filed: Aug. 28, 2001

(86) PCT No.: PCT/SG01/00171

§ 371 (c)(1),
(2), (4) Date: Feb. 27, 2004

(87) PCT Pub. No.: WO03/019423

PCT Pub. Date: Mar. 6, 2003

(65) Prior Publication Data

US 2004/0263509 A1    Dec. 30, 2004

(51) Int. Cl.
*G09G 5/00* (2006.01)
*G06F 3/033* (2006.01)

(52) U.S. Cl. .................. 345/156; 345/158
(58) Field of Classification Search ........... 345/156, 345/158, 163, 167
See application file for complete search history.

(56) References Cited

U.S. PATENT DOCUMENTS

| 5,237,647 | A | * | 8/1993 | Roberts et al. | 345/419 |
|---|---|---|---|---|---|
| 5,371,778 | A | * | 12/1994 | Yanof et al. | 378/4 |
| 5,561,445 | A | * | 10/1996 | Miwa et al. | 345/163 |
| 5,581,670 | A | * | 12/1996 | Bier et al. | 715/856 |
| 5,583,977 | A | * | 12/1996 | Seidl | 345/619 |
| 5,798,752 | A | * | 8/1998 | Buxton et al. | 715/863 |
| 5,923,318 | A | * | 7/1999 | Zhai et al. | 345/157 |
| 5,929,844 | A | * | 7/1999 | Barnes | 345/156 |
| 5,949,401 | A | * | 9/1999 | Kazarian | 345/156 |
| 6,184,867 | B1 | * | 2/2001 | Kandogan et al. | 345/161 |
| 6,184,869 | B1 | * | 2/2001 | Harding et al. | 345/163 |
| 6,198,471 | B1 | * | 3/2001 | Cook | 345/161 |
| 6,333,753 | B1 | * | 12/2001 | Hinckley | 715/768 |
| 6,380,958 | B1 | * | 4/2002 | Guendel et al. | 715/848 |
| 6,545,663 | B1 | * | 4/2003 | Arbter et al. | 345/158 |
| 6,674,440 | B1 | * | 1/2004 | Kirkland et al. | 345/503 |
| 2002/0012013 | A1 | * | 1/2002 | Abe et al. | 345/764 |

* cited by examiner

*Primary Examiner*—Ulka Chauhan
*Assistant Examiner*—Daniel Washburn
(74) *Attorney, Agent, or Firm*—Aaron S. Haleva; Kramer Levin Naftalis & Frankel LLP (57) ABSTRACT

A computer system for permitting user interaction with a three-dimensional computer model defines an initial correspondence between the computer model and a real world workspace. An editing volume of the workspace is also defined, and a stereoscopic image of the section of the computer model within the editing volume is displayed. Using a first input device a user can translate and/or rotate the model, and rotate the editing volume, so as to bring different portions of the model into the editing volume, and thus into the user's view. The user operates a second input device to indicate changes to be made to the model. The first and second input devices can be operated with the user's respective hands. Since only the portion of the model within the editing volume need be displayed, the processing and display requirements are reduced, in comparison to displaying the entire model.

25 Claims, 6 Drawing Sheets

METHODS AND SYSTEMS FOR INTERACTION WITH THREE-DIMENSIONAL COMPUTER MODELS

This application is the national stage filing of corresponding international application number PCT/SG01/00171, filed Aug. 28, 2001.

FIELD OF THE INVENTION

The present invention relates to methods and systems for interacting with three-dimensional computer models.

BACKGROUND OF THE INVENTION

Two main types of three-dimensional computer data models of the real world are in use today. One deals with the real world by sampling it, while the other approximates the real world by approximating it using mathematical functions. The sampling method leads to volumetric models, and uses voxels as the main representation unit. The mathematical method, an example of which is called CAD (Computer Aided Design), creates models which use polygons as primitives. Polygons are good for rendering the external surfaces of a three-dimensional object, but accurately rendering the internal features of the human body, for example, requires so-called "volume rendering" using "voxels", which are three-dimensional image components.

Specifically, volume rendering is a technique for visualizing three-dimensional arrays of sampled data. Examples of sampled three-dimensional data are medical data from CAT or MRI scanners, seismic data, or any other volumetric information for which geometric surfaces are difficult to generate or unavailable. Volume rendering takes the original sampled data, interpolates between the available data to fill in the gaps, and displays the resulting three-dimensional image to the user on a screen (using perspective or orthogonal projection).

A major issue when interacting with typical images produced by volume rendering is the sheer size of the data sets. More often than not, the data sets sources like CT and MR) need to be processed at the same time. This factor, together with other factors such as the amount of interpolation which needs to be done and the footprint of the rendered volume, can adversely affect the rendering speed. This problem is compounded when the user tries to view the volume at a high magnification, during which the system can slow to a crawl.

By contrast, mathematical methods such as CAD represents three-dimensional objects as mathematical functions, usually polygons and polylines. However, as for volume rendering, the sheer size of the data makes real-time interaction a problem because of the rendering speed required to produce new images in less than 100 milliseconds (10 per second).

Both volume rendering and CAD result in a rendering in a "frame buffer"

With the increasing power of computers, volume rendering and CAD are capable of generating increasingly complex data models. However, the computers' ability to "render" the models is limited by several factors:

The size of the model (i.e. the number of elements in it, defined as the number of polygons in the case of CAD, or the number of voxels in the case of volume rendering). The bigger the size, the slower it is to process and render on the screen.

The size of the footprint (i.e. the area covered by the projection of the object on the frame buffer of a screen) when rendered. The larger the footprint, the slower the processing.

The degree of simplification when rendering the model (i.e. the level of detail). Objects can be simplified in their final display to speed up rendering.

One existing technology for displaying three dimensional models (whether created by volume rendering or CAD) is called the Dextroscope, which is used for visualisation by a single individual. A variation of the Dextroscope, for use in presentations to an audience, and even a large audience, is called the DextroBeam. This Dextroscope technology displays a high-resolution stereoscopic virtual image in front of the user.

The software of the Dextroscope uses an algorithm having a main loop in which inputs are read from the user's devices and actions are taken in response. The software creates a "virtual world" which is populated by virtual "objects". The user controls a set of input devices with his hands, and the Dextroscope operates such that these input devices correspond to virtual "tools", which can interact with the objects. For example, in the case that one such object is virtual tissue, the tool may correspond to a virtual scalpel which can cut the tissue.

Figure 1:
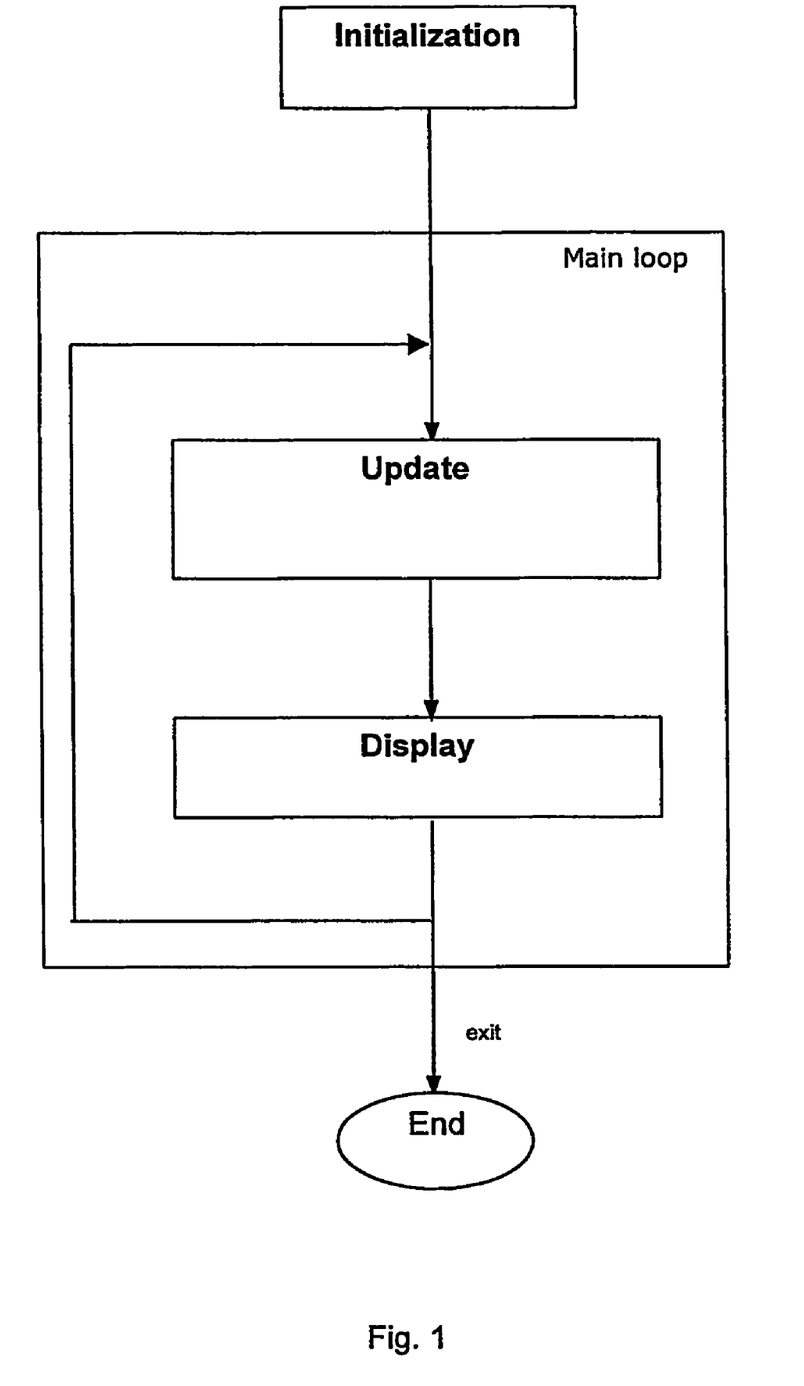
FIG. 1 is a flow diagram showing the operating process of a known visualisation system.

FIG. 1 shows the stages in the operation of the Dextroscope. There are three main stages: (1) Initialization, in which the system is prepared, followed by and endess loop of (2) Update, in which the input from all the input devices are received and the objects are updated, and (3) Display, in which each of the updated objects in the virtual world is displayed in turn.

Within the Update stage, the main tasks are:

reading all the input devices connected to the system.

finding out how the virtual tool relates to the objects in the virtual world acting on the objects according to the programmed function of the tool updating all objects The tool controlled by the user has four states: "Check", "StartAction", "DoAction" and "EndAction". Callback functions corresponding to the four states are provided for programming the behaviour of the tool.

"Check" is a state in which the tool is passive, and does not act on any object. For a stylus (a three-dimensional-input device with a switch), this corresponds to the "button-not-pressed" state. The tool uses this time to check the position with respect to the objects, for example if is touching an object.

"StartAction" is the transition of the tool from being passive to active, such that it can act on any object. For a stylus, this corresponds to a "button-just-pressed" state. It marks the start of the tool's action, for instance "start drawing". DoAction is a state in which the tool is kept active. For a stylus, this corresponds to "button-still-pressed" state. It indicates that the tool is still carrying out its action, for instance, "drawing". EndAction is the transition of the tool from being active to being passive. For a stylus, this corresponds to "button-just-released" state. It marks the end of the tool's action, for instance, "stop drawing".

A tool is typically modelled such that its tip is located at object co-ordinates (0,0,0), and it is pointing towards the positive z-axis. The size of a tool should be around 10 cm. A tool has a passive shape and an active shape, to provide visual cues as to which states it is in. The passive shape is the shape of the tool when it is passive, and active shape is the shape of the tool when it is active. A tool has default passive and active shape.

A tool acts on objects when it is in their proximity. A tool is said to have picked the objects.

Generally, a tool is said to be "in" an object if its tip is inside a bounding box of the object. Alternatively, the programmers may define an enlarged bounding box which surrounds the object with a selected margin ("allowance") in each direction, and arrange that the software recognises that a tool is "in" an object if its tip enters the enlarged bounding box. The enlarged bounding box enables easier picking. For example, one can set the allowance to 2 mm (in the world's coordinate system, as opposed to the virtual world), so that the tool will pick an object if it is within 2 mm of the object's proximity. The default allowance is 0.

SUMMARY OF THE INVENTION

The present invention seeks to provide a new and useful ways to interact with three dimensional computer generated models in an efficient way.

In general terms, the present invention proposes that a computer system defines an initial correspondence between a three-dimensional computer model and a real world workspace. An editing volume of the workspace is also defined, and a stereoscopic image of the section of the computer model within the editing volume is displayed. Using a first input device, the model can be virtually translated and/or rotated, and the editing volume can be rotated, so as to bring different sections of the model into the editing volume, and thus into the user's view. The user operates a second input device to indicate changes to be made to the model. The first and second input devices can be operated with the user's respective hands.

Thus, the present invention permits a visualisation of, and modification of, the three-dimensional model, in an efficient and natural manner.

Furthermore, since only the portion of the model within the editing volume need be displayed, the processing and display requirements are reduced, in comparison to displaying the entire model. This in turn means that the display can be updated quickly without the computer system requiring excessive computing power.

Specifically, in a first aspect, the present invention proposes a computer system for permitting interaction between a user of the computer system and a three-dimensional computer model, the computer system including:

- a processor for storing the model, a mapping defining a geometrical correspondence between portions of the model and respective portions of a real world workspace, and data defining an editing box of the workspace,
- display means for generating an image having an apparent location within the editing volume, the image being an image of the section of the model within the editing volume according to the mapping,
- at least one first input device for operation by the first hand of a user to input first signals to the processor, the processor being arranged to change both the editing volume and the geometrical correspondence between the model and the workspace, to change the section of the model within the editing volume, and
- at least one second input device for operation by the second hand of the user to input second signals to the processor, the processor being arranged to modify the model based on the second signals.

In a second aspect the invention provides a computer-implemented method for permitting a user to interact with a three-dimensional computer model, the method including:

- storing the model, a mapping defining a geometrical correspondence between portions of the model and respective portions of a real world workspace, and data defining an editing volume of the workspace,
- and repeatedly performing a set of steps consisting of:
- generating an image having an apparent location within the editing volume, the image being an image of the section of the model within the editing volume according to the mapping,
- receiving first signals from at least one first input device operated by a first hand of the user, and based on the first signals changing both the editing volume and the geometrical correspondence between the model and the real space, to change the section of the model within the editing volume, and
- receiving second signals from at least one second input device operated by a second hand of the user, and modifying the model based on the second signals.

The second input devices may, for example, be of the form of the known input devices described above, corresponding to virtual "tools".

The control device may be operated in a selected one of a plurality of modes, and in different modes different motions of the control device correspond to different motions of the model and/or the editing volume. Preferably, in at least one of these modes both the position and the orientation of the model in relation to the workspace are changed based on motions of the control device. As described below, such re-selections of the positioning of the editing volume and the model can be very helpfully used to visualise the model, without unnecessarily consuming computing power.

Preferably, the user is further empowered (e.g. using the first input device again, or by speaking into a microphone to generate commands which are transmitted to the processor) to change the scale of the correspondence between the model and the workspace. One such change in the correspondence is to magnify the model, to display within the editing volume (which remains constant in size) an expanded image of a smaller portion of the model.

Preferably, the modifications to the model based on the second signals are only to the section of the model corresponding to the editing volume. In other words, only the portion of the model which is displayed is affected by the virtual tools.

The three-dimensional computer-generated models may be data representations of any real world three-dimensional objects. For example, they may be representations of objects such as houses or biological cells. Alternatively, the model may be a model of at least part of the subject of a surgical operation, and the step of modifying the model based on the second signals may be performed to simulate the actions on the subject of a surgical device corresponding to the second input device (tool). For example, the virtual tool may be a scalpel cutting virtual tissue of the object.

This document uses the term "position" of an entity (e.g. an object, a tool, a device, the editing volume, etc) to mean its three-dimensional location (e.g. the location of a central point of the entity), and does not include the orientation of the entity. Thus, the "position" of an entity is written as three numbers, (X, Y, Z), with respect to a predefined system of axes X, Y and Z. The "orientation" of an entity is also written using three numbers, ($\alpha$, $\beta$, $\gamma$), representing the orientation of the entity with respect to the same axis system. The term "placement" means the combination of the position and the orientation of the object (i.e. it is written as six numbers).

Preferably, the image is "stereoscopic", a term which is used here to include any display technique which generates two different images, one for each eye, so that the apparent image fused in the brain can be perceived to occupy space. For example, the display techniques in use in the Dextroscope and the Dextrobeam are suitable for use in the present invention.

BRIEF DESCRIPTION OF THE FIGURES

An embodiment of the invention will now be described, for the sake of example only, with reference to the following figures in which:

FIG. 2, which is composed of FIGS. 2(a) to 2(e), illustrates four ways of re-positioning elements permitted by the embodiment;

DETAILED DESCRIPTION OF THE EMBODIMENT

Figure 2A:
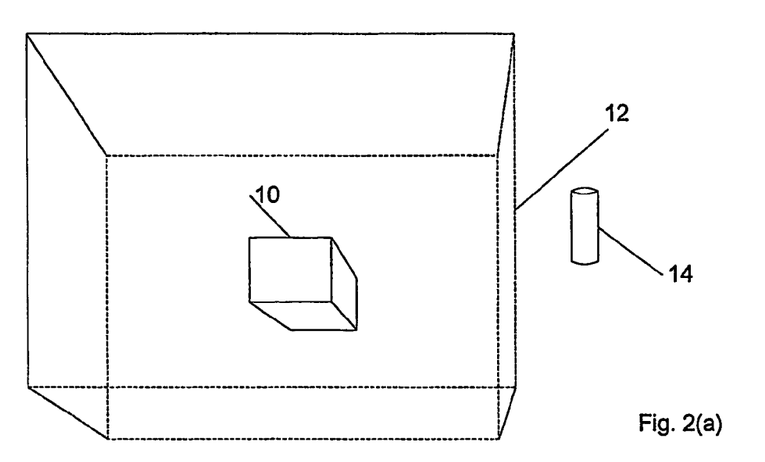

FIG. 2(a) shows the three-dimensional workspace of a user of a system according to the present invention. This workspace may be a fixed three-dimensional region of real space. It may correspond to (at least part of) the visual field of the user. A computer system is provided to generate a stereoscopic display within this workspace. The computer stores a three-dimensional model (shown as 12 in FIG. 2(a), but not visible to the user of the system), which has an initial (preselected) correspondence to the real workspace, i.e. such that all points of the model correspond to respective points of the workspace. The model may be composed either of a single virtual object (here just called an "object") which is contiguous in the virtual world, or of a plurality of objects which are separated in the virtual world. In FIG. 2(a), for simplicity, the model 12 is shown as a cuboid.

As shown in FIG. 2(a), the user perceives an editing volume 10 defining a sub-volume of the volume object 12. The editing volume 10 is a region of the three-dimensional workspace shaped as a parallelepiped (as shown in FIG. 2(a) it is a cuboid) which defines the minimum and maximum boundaries of display of objects. Hence the editing volume is referred to here as an "editing box". Its six faces collectively bound the area where objects (typically volumetric data sets) are displayed. Generally, objects lying outside the editing box 10 are not displayed.

The editing box 10 is itself displayed on the computer screen as a wire-frame showing the edges of the box. The editing box 10 cuts through the three-dimensional model 12. The editing box 10 preferably has a linear length and height of approximately 15 to 20 cm with an adjustable thickness (which is adjusted to suit the user's needs). The editing box 10 is centered in the three-dimensional workspace, providing a comfortable working area.

The position of the editing box 10 within the workspace is user-defined and can be adjusted with additional controls. However, during normal operation of the invention (as discussed below in relation to FIGS. 2(b)-(e)) the position of the centre of the editing box 10 is fixed. The editing box 10 thus remains centered in the workspace, where stereo convergence is best and at the most comfortable position for intricate operations.

The section of the computer model 12 which is within the editing box 10 is displayed stereoscopically (though this is not shown on FIG. 2). The user can reselect which section of the computer model is displayed (i.e. the model 12 is moved and/or rotated in relation to the editing box 10) as described below, to bring different parts of the computer model 12 into view. Furthermore, the scale of the geometric correspondence between the model 12 and the real space can be changed, so that the proportion of the model 12 within the editing box 10 changes. Thus, the user can zoom into the model 12 to see details or zoom out for an overall view. Whether the user is changing the zoom level of the model 12, or operating on the portion of the three-dimensional model displayed within the editing box 10, the response and updating of the display in the editing box 10 is maintained generally constant. This is due to the fact that the ratio between amount of volume detail to display and the footprint of the resulting display is kept almost constant: the size of the editing box 10 is fixed and thus fixes the footprint, regardless of the enlargement of the model 12.

The user's non-dominant hand (e.g. for right-handed individuals, the left hand) holds a control device 14 like a joystick, which is used to control the view of the model given by the editing box 10. It allows six degrees of freedom control: three for position (X, Y, Z) and three for orientation ($\alpha$, $\beta$, $\gamma$). Control devices 14 which are suitable for use in this context are widely publicly known.

Depending on the application, the model 12 can be moved together with the editing box 10, or the movement of one can be independent of the other. Table 1 shows three of the possible modes of operation of the control device 14.

TABLE 1

| Movement of control device 14 | Translates to movement of: | |
|---|---|---|
| | model 12 | editing box 10 |
| Case 1 | | |
| X | X | Fixed |
| Y | Y | Fixed |
| Z | Z | Fixed |
| $\alpha$ | $\alpha$ | $\alpha$ |
| $\beta$ | $\beta$ | $\beta$ |
| $\gamma$ | $\gamma$ | $\gamma$ |
| Case 2 | | |
| X | X | Fixed |
| Y | Y | Fixed |
| Z | Z | Fixed |
| $\alpha$ | Fixed | $\alpha$ |
| $\beta$ | Fixed | $\beta$ |
| $\gamma$ | Fixed | $\gamma$ |
| Case 3 | | |
| X | X | Fixed |
| Y | Y | Fixed |
| Z | Z | Fixed |
| $\alpha$ | $\alpha$ | Fixed |
| $\beta$ | $\beta$ | Fixed |
| $\gamma$ | $\gamma$ | Fixed |

Figure 2B:
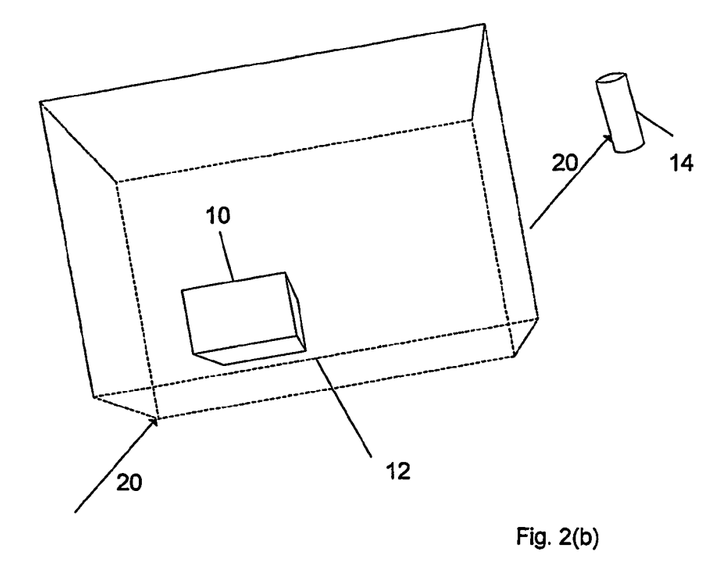

As described earlier, the editing box 10 should remain centered in the workspace (i.e. an arbitrary central point of the editing box does not change its position). Therefore, in all cases when the user moves the tool along the X, Y and Z axes, the action pans the model 12 in the corresponding direction to bring different portions of the model 12 into the editing box 10. The editing box 10 itself does not move. When the user rotates the control device 14 (the angles of motion being measured by $\alpha$, $\beta$, and $\gamma$), the action can either be translated into rotation of the editing box 10, the model 12, or both together:

In case 1, the model 12 and editing box 10 rotate together. The rotation of the editing box 10 is around its centre point, allowing the user to view the sub-volume from all sides. This mode is represented in FIG. 2(*b*), which is to be compared with FIG. 2(*a*). FIG. 2(*b*) includes a set of fixed axes 16 for the help of the reader, though they are not displayed to the user of the embodiment. FIG. 2(*b*) shows how translating the control tool 14 upwards and to the right by a vector 20 and rotating it (in comparison with the positioning shown in FIG. 2(*a*)), has caused rotation (but no translation) of the editing box 10, and both translation (upward and rightward, by the same vector 20) and rotation of the model 12. Both the editing box 10 and the model 12 are rotated by the same angle as the control tool 14.

Figure 2C:
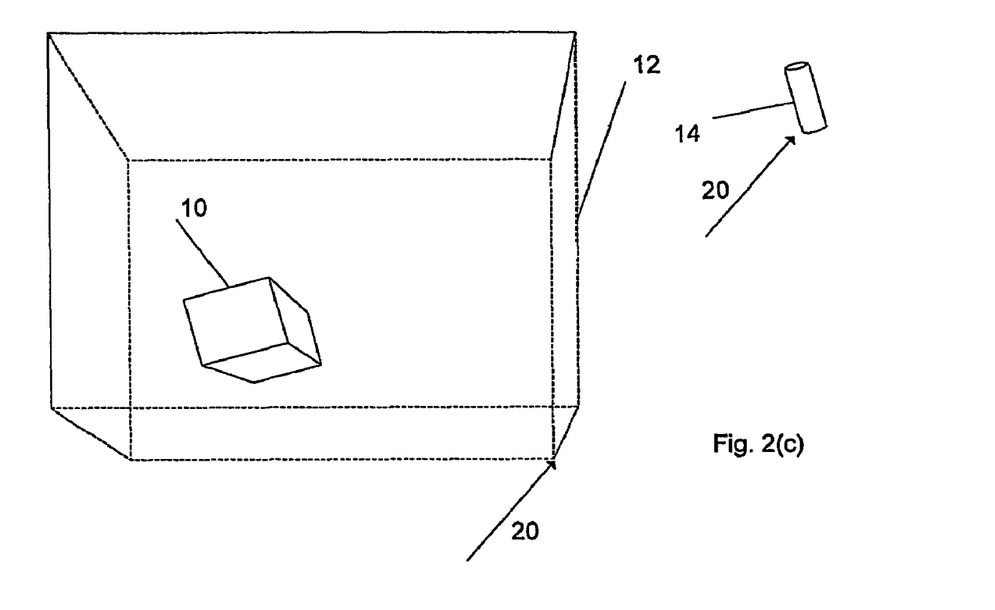
Figure 2D:
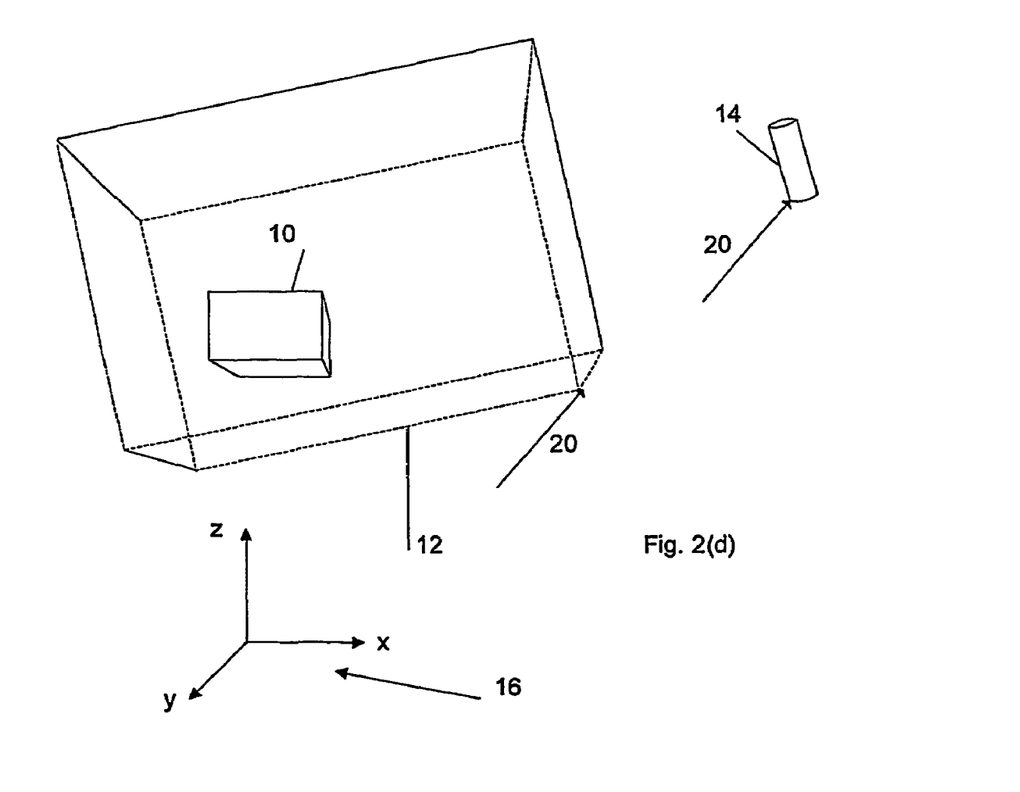

In case 2, the editing box 10 rotates about its centre point across the model 12 (the orientation of the model 12 remaining fixed), revealing different sub-volumes of the computer model 12. This is shown in FIG. 2(*c*), in which the model 12 is shown displaced by vector 20, but not rotated, while the editing box 10 is rotated by the same rotation as the control device 14, but not translated.

In case 3, as shown in FIG. 2(*d*), the model 12 is displaced by the vector 20 and rotates according to the orientation of the control device 14 while the editing box 10 remains fixed, so that the user sees changing sub-volumes which are inclined according to the movement of the control device 14.

We can also envisage a fourth case (case 4) which is shown in FIG. 2(*e*). In this case, one face 18 of the editing box 10 is labelled as an "active face". In this case, as in case 1, the orientation of both the sub-volume 12 and the editing box 10 vary corresponding to the orientation of the control tool 14. However, the displacement vector 22 by which the position of the model 12 changes is the component of the vector 20 projected into the plane of the active face 18, which is shown as the vector 24. Thus, the active face 18 constitutes a face along which the model 12 can be panned.

Figure 2E:
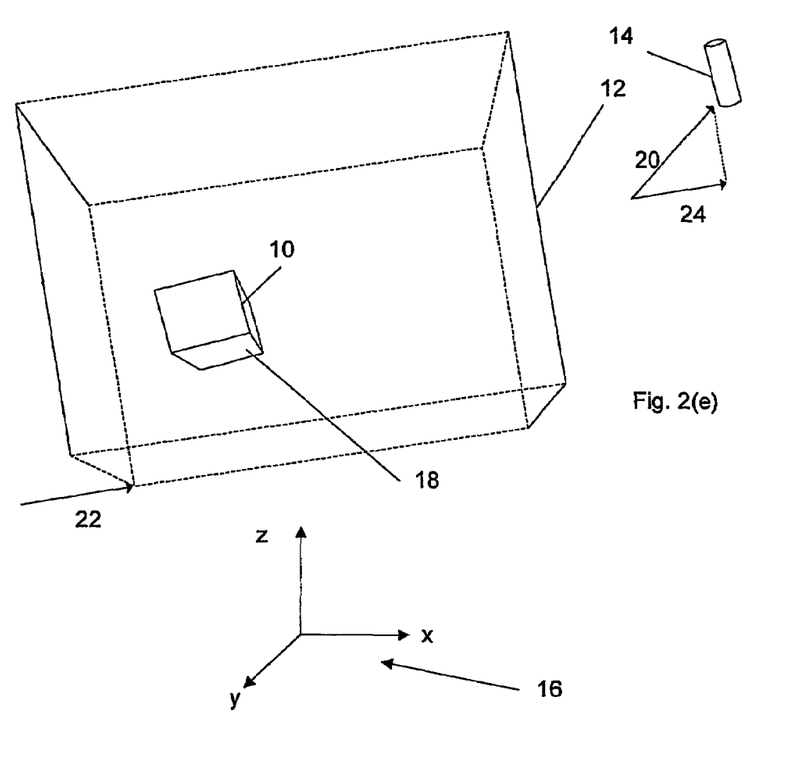

Note that if it is desired to move the editing box perpendicular to face 18 this may be performed by a separate operation, e.g. performed by the user's dominant hand. For example, we may define a border of the editing box and if the user's dominant hand intersects with this border in case 4 the box is moved perpendicular to the face 18. Thus, the border of the editing box works like a holder which enables the editing box to be moved up and down by the user's dominant hand perpendicular to the face 18.

While the user's non-dominant hand manipulates the control device 14, the user's dominant hand holds a stylus (or other input device) which is used to operate on the portion of the three-dimensional computer model within the editing box 10. This second input device may for example be the known tool discussed above, which corresponds to a tool in the virtual word. As in the known system, for example, the tool may interact with any virtual object comprised in the model 12 if the virtual position of the tool coincides with that object (e.g. to within a tolerance defined by a bounding box, as discussed above). Furthermore, the object must generally be within the editing box 10 at this time. In this way, for example, the user is able to simulate operations (e.g. surgical operations) on the three-dimensional model. The type of operation depends on the application in which this embodiment is used. For example, if the embodiment is used in a three-dimensional volumetric contour editor, the stylus or other input device may be used to add the nodes that define the contours.

Note that the control device 14 does not have to be located within or even near the editing box 10. However, preferably a co-ordinate center of the control device 14 defines the centre of rotation of the model or editing box, whichever is presently selected. By contrast, the stylus (or other input devices) which correspond to virtual tools may optionally be selected only to interact with objects within the model 12 if they are positioned to virtually contact those objects (e.g. to within a certain tolerance); that is, these input devices are generally located within or very near to the editing box 10.

As mentioned above, the parts of the model 12 outside the editing volume 10 are normally not displayed. We say that the model 12 is "clipped". Specifically, each face of the editing box 10 is defined by a plane equation of form: (ax+by+cz=d), where x, y, and z represent the three Cartesian axes, and a, b, c, and d are constants that characterize the plane. The model 12 is tested in turn against each of the planes. Those parts of the model 12 which are found to be outside the editing box 10 are not displayed, which can result in the non-display of either entire objects or parts of them. Clipping can be performed in the computer system of the invention either in hardware or in software with the former being faster.

Figure 3:
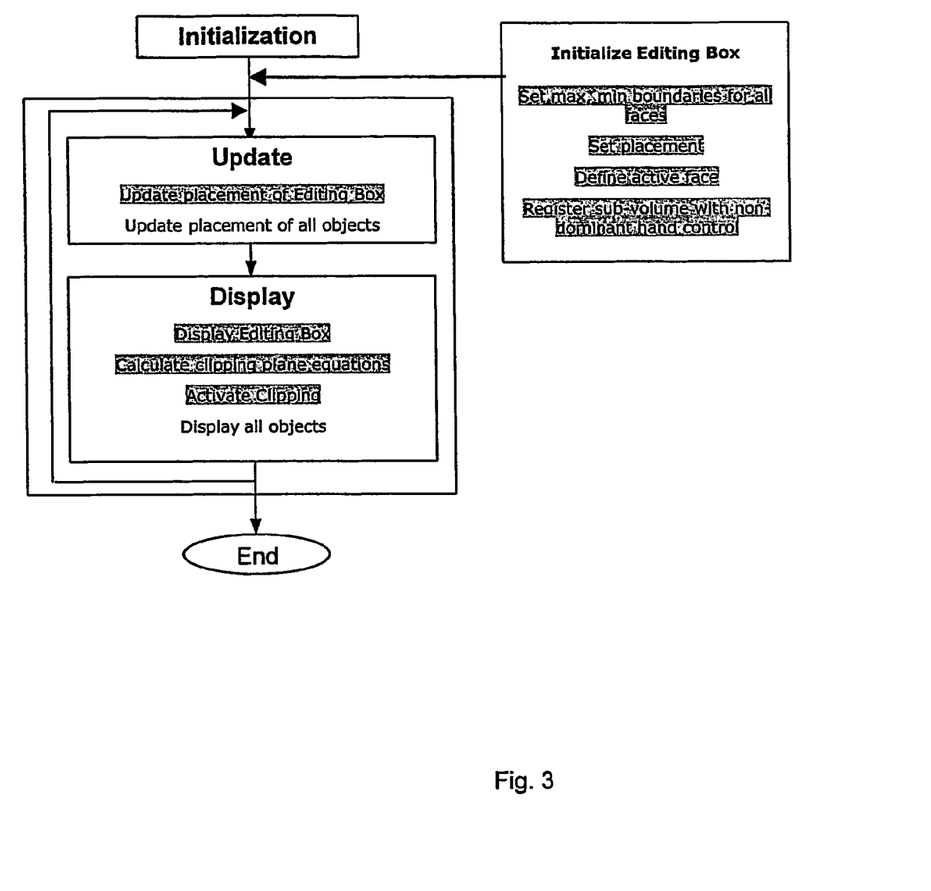
FIG. 3 is a flow diagram showing how the flow diagram of FIG. 1 is modified in the embodiment of the present invention.

The computer process runs in the computer system of the present embodiment on the same principles described above in relation to FIG. 1, but the main loop is modified as shown in FIG. 3 to accommodate the new properties of this invention. The new steps are shown shaded on FIG. 3.

Specifically, the initialisation of FIG. 1 is modified to include a step of initialising the editing box 10, in which the maximum and minimum boundaries of all faces are set, the placement of the editing box 10 is set, the active face 18 is defined, and initial correspondence of the model 12 to the real space is defined, e.g. using the control device 14 operated with the user's non-dominant hand.

The "update" step is modified to include an updating of the placement of the editing box 10 and the model 12. The "display" step is modified to include displaying only the portion of the model 12 within the editing box 10. This includes calculation of the clipping plane, and activating the clipping.

The objects are displayed within the editing box 10 by making use of the newly obtained clipping planes. The display takes place up to the boundaries of the editing box 10, a standard technique in computer graphics. This produces cut away views of volume rendered images or polygonal objects.

Figure 4:
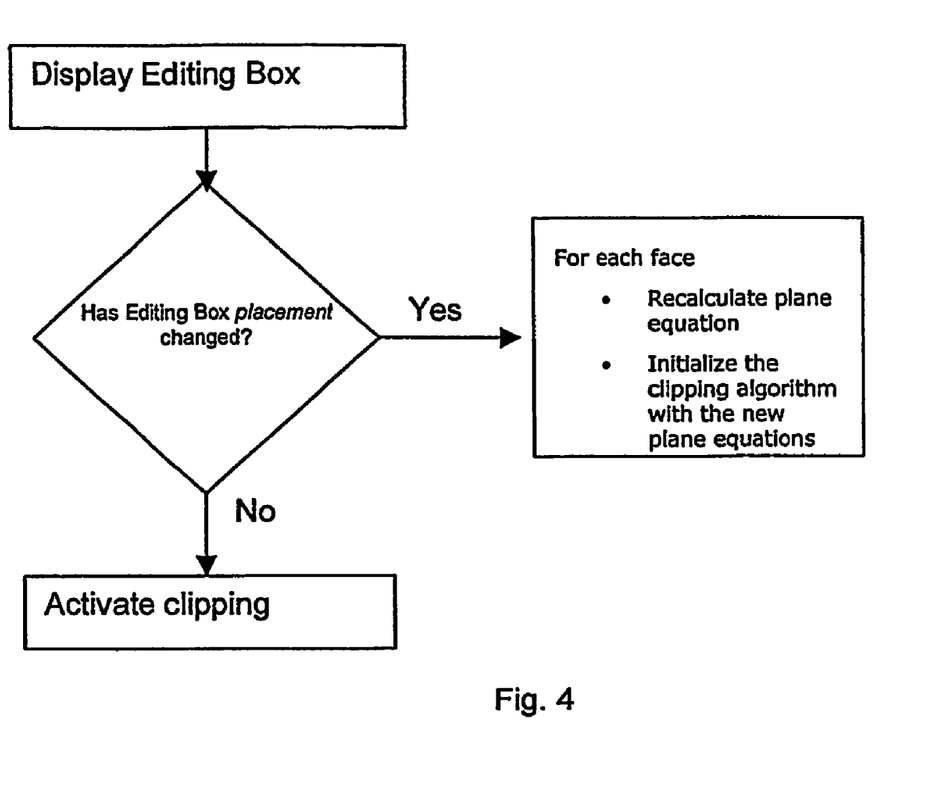
FIG. 4 is a flow diagram of the logical steps in the clipping operation of the embodiment.

Changing the placement of the editing box 10 affects the final plane equations which determine which parts of the model 12 are clipped. FIG. 4 shows in more detail the "Display" step of FIG. 3. Specifically, following the step of displaying the editing box, a determination is made of whether the editing box has changed, and if so the six plane equations are recalculated, and the clipping algorithm is initialised with the new plane equations. Only then is the step of "activate clipping" performed.

The control device 14 may be a joystick (or stylus) having a button. It has 4 states, analogous to the 4 states of the stylus (or input device) described above. The 4 states are as follows:

Check—Joystick button is not pressed.
StartAction—Transition state from Check to DoAction
DoAction—Joystick button is pressed.
EndAction—Transition state from DoAction back to Check In each of these states the steps carried out by the process are as follows:

StartAction
Store the initial placement of the control device
Compute and store the difference in placement between the control device and the model
Compute and store the difference in placement between control and the editing box Compute and store the difference in position between the model and the editing box DoAction Compute and store the model's placement based on the current placement of the control device Compute and store the placement of the editing box based on the current placement of the control device Conditional Updating (according to any of the cases defined in Table 1 or case 4)

Specifically, this final step consists of:

In case 1: Setting the new placement of the model.
Setting the new orientation of the editing box.

In case 2: Setting the new position of the model
Setting the new orientation of the editing box In case 3: Setting the new placement of the model In case 4: a) Setting the new orientation of the editing box and the model
b) Computing the tentative position of the model based on the stored displacement between the model and the editing box.
c) Computing the plane equation of the active face of the editing box.
d) Projecting the control device's current position onto the active face. (p1)
e) Projecting the control device's initial position onto the active face (p2)
f) Computing the displacement vector (p1-p2) (which is equal to vector 24 in the notation above).
g) Computing the final position of model as the tentative position plus the displacement vector
h) Setting the position of the model.

The invention claimed is:

1. A computer system for permitting interaction between a user of the computer system and a three-dimensional computer model, comprising:
a processor for storing the model, a mapping defining a geometrical correspondence between the model and a real world workspace, and data defining a three-dimensional editing volume of the workspace;
display means for rendering a 3D image of that portion of the model within the editing volume;
at least one first input device for operation by a first hand of a user to input first signals to the processor, the processor being arranged to do any of: modify the geometrical correspondence between the model and the workspace, modify the orientation of the editing volume relative to the workspace and translate or rotate said portion of the model relative to the editing volume, in response to said first signals; and
at least one second input device for operation by a second hand of the user to input second signals to the processor, the processor being arranged to do any of: modify the 3D position of the editing volume relative to the workspace and modify or operate upon a portion of the model, in response to said second signals,
wherein the boundaries of the editing volume are at least one of: continuously displayed, displayed when changed, displayed upon any translation or rotation of the editing volume or selection of an active face, displayed upon change of the geometrical correspondence between the model and the workspace, displayed upon input of any signals to the processor via the first input device, and displayed upon user command,
and wherein the first signals can only be input via the first input device and the second signals can only be input by the second device such that at any given time each hand of the user controls a specific and distinct set of interactive functionalities.

2. The computer system of claim 1, having at least one mode of operation in which the processor changes the mapping to change both the position and the orientation of the model in relation to the workspace based on said first signals.

3. The computer system of claim 1, having at least one mode of operation in which the processor changes the mapping to change the scale of the geometrical correspondence between portions of the model and respective portions of the real world workspace based on said second signals, whereby the magnification of the image is varied.

4. The computer system of claim 1, further including a microphone, and having a mode of operation in which the processor changes the mapping to change the scale of the geometrical correspondence between portions of the model and respective portions of the real world workspace based on voice signals received from said microphone, whereby the magnification of the image is varied.

5. The computer system of claim 1, in which the first input device generates the signals in correspondence to the position and/or orientation of the first input device.

6. The computer system of claim 5, in which in at least one mode of operation the processor makes linear variations in the correspondence of the model and the workspace corresponding to components of translations of the first input device in a specified plane.

7. The computer system of claim 1, having at least one mode of operation in which the processor is arranged to rotate the editing volume about an axis based on said first signals.

8. The computer system of claim 1, in which the processor is arranged only to modify the section of the model within the editing volume based on said second signals.

9. The computer system of claim 1, in which the display means is arranged to generate the image as a stereoscopic image.

10. The computer system of claim 1, wherein the editing volume is set without regard to any object boundaries within the model.

11. The computer system of claim 1, wherein the edges of the editing volume are displayed as a wire frame on the display means.

12. The computer system of claim 1, further comprising data defining one or more additional three-dimensional editing volumes of the workspace, wherein the editing volume and said additional three-dimensional editing volumes can be displayed as overlapping.

13. The computer system of claim 1, wherein said first signals directing a translation of said portion of the model can cause translation of said portion of the model with said editing volume is fixed.

14. The computer system of claim 1, wherein said first signals directing a rotation of said portion of the model can cause at least one of: rotation of said portion of the model with said editing volume being fixed, rotation of said editing volume with said portion of the model being fixed, and rotation of both said portion of the model and said editing volume.

15. The computer system of claim 1, wherein said modifying the 3D position of the editing volume in response to said second signals includes a user moving said editing volume up and down by a user virtually grabbing a border of the editing volume.

16. A computer-implemented method for permitting a user to interact with a three-dimensional computer model, comprising:

storing the model, a mapping defining a geometrical correspondence between portions of the model and respective portions of a real world workspace, and data defining a three-dimensional editing volume of the workspace; and repeatedly performing the following:

rendering a 3D image of that portion of the model within the editing volume;

receiving first signals from at least one first input device operated by a first hand of the user, and based on the first signals doing any of: modifying the geometrical correspondence between the model and the workspace, modifying the orientation of the editing volume relative to the workspace and translating or rotating said portion of the model relative to the editing volume; and receiving second signals from at least one second input device operated by a second hand of the user, and based upon the second signals doing any of: modifying the 3D position of the editing volume relative to the workspace and modifying or operating upon a portion of the model, wherein the boundaries of the editing volume are at least one of: continuously displayed, displayed when changed, displayed upon any translation or rotation of the editing volume or selection of an active face, displayed upon change of the geometrical correspondence between the model and the workspace, displayed upon input of any signals to the processor via the first input device, and displayed upon user command, and wherein the first signals can only be input via the first input device and the second signals can only be input by the second device such that at any given time each hand of the user controls a specific and distinct set of interactive functionalities.

17. The method of claim 16, wherein the second hand of the user is the user's dominant hand and the first hand of the user is the user's sub-dominant hand.

18. The method of claim 16, further comprising changing the scale of the geometrical correspondence between portions of the model and respective portions of the real world workspace based on said second signals, whereby the magnification of the image is varied.

19. The method of claim 16, further comprising changing the scale of the geometrical correspondence between portions of the model and respective portions of the real world workspace based on signals received from a microphone, whereby the magnification of the image is varied.

20. The method of claim 16 wherein the first input device generates the first input signals in correspondence to the position and/or orientation of the first input device.

21. The method of claim 20, wherein the correspondence of the model and the workspace is varied linearly in correspondence to components of translations of the first input device in a specified plane.

22. The method of claim 16, further comprising rotating the editing volume about an axis based on said first signals.

23. The method of claim 16, wherein the step of modifying the model based on the second signals modifies only the section of the model within the editing volume.

24. The method of claim 16, wherein the image is a stereoscopic image.

25. The method of claim 16, further comprising data defining one or more additional three-dimensional editing volumes of the workspace, wherein the editing volume and said additional three-dimensional editing volumes can be displayed as overlapping.

* * * * *